(12) United States Patent
Bishop et al.

(10) Patent No.: US 9,797,713 B2
(45) Date of Patent: Oct. 24, 2017

(54) CONTOUR PROBE LINKAGE FOR A HORIZONTAL BEAM OPTICAL COMPARATOR

(71) Applicant: Dorsey Metrology International, Poughkeepsie, NY (US)

(72) Inventors: John C. Bishop, Cookeville, TN (US); Mark R. Swenson, Jr., Poughkeepsie, NY (US)

(73) Assignee: Dorsey Metrology International, Poughkeepsie, NY (US)

( * ) Notice: Subject to any disclaimer, the term of this patent is extended or adjusted under 35 U.S.C. 154(b) by 2 days.

(21) Appl. No.: 14/864,958

(22) Filed: Sep. 25, 2015

(65) Prior Publication Data

US 2016/0091302 A1    Mar. 31, 2016

Related U.S. Application Data

(60) Provisional application No. 62/057,336, filed on Sep. 30, 2014.

(51) Int. Cl.
*G01B 11/24* (2006.01)
*G01B 11/03* (2006.01)

(52) U.S. Cl.
CPC .............. *G01B 11/24* (2013.01); *G01B 11/03* (2013.01)

(58) Field of Classification Search
CPC ................................ G01B 11/03; G01B 11/24
USPC .................................................. 356/601–640
See application file for complete search history.

(56) References Cited

U.S. PATENT DOCUMENTS

2009/0144999 A1*   6/2009   Lau .......................... G01B 5/12
                                                                33/544.1

* cited by examiner

*Primary Examiner* — Tri T Ton
(74) *Attorney, Agent, or Firm* — Saile Ackerman LLC; Stephen B. Ackerman

(57) ABSTRACT

The present disclosure describes an improved horizontal beam optical comparator that includes a probe to follow the surface of a work-piece, moreover, providing a method for gathering changes in height and depth to measure, plot and delineate surface contours of work-pieces relative to a movable "X" axis stage, and depth along a moveable "Y" axis stage without presence in the objective lenses depth of field.

7 Claims, 5 Drawing Sheets

CONTOUR PROBE LINKAGE FOR A HORIZONTAL BEAM OPTICAL COMPARATOR

BACKGROUND OF THE INVENTION (1) Technical Field

This disclosure relates to the measurement of features contained on manufactured parts using a horizontal beam optical comparator, and more particularly with a method and means for plotting contours of three dimensional shapes that are not in the lenses field of view.

(2) Description of the Related Art

In today's manufacturing environment, most operations employ a blend of new technology with tried and reliable older systems. Many manufacturers feature the well proven easily used horizontal beam optical comparator (HBOC) as an inspection tool of choice. The HBOC has a beam of light traveling horizontally across a motorized, or manually adjusted, horizontal stage. This type of comparator is ideal for heavy parts and shafts held on "V" blocks or between centers. Typical work-pieces include castings, transmission shafts, thread form measurement and fabricated machined parts.

As competition increases in the world market, new and improved measuring tools are vital to enhance product quality as well as reduction of product cost.

Optical comparators, particularly of a type that project a shadow image or an obliquely illuminated image of fabricated parts onto a screen overlaid by a template of the part, have enjoyed widespread acceptance as robust and reliable forms of measurement by providing measurement results in a visual and verifiable form. Differences between projected edge features of the part and one or more tolerance boundaries of the same features inscribed on the templates are readily apparent on a comparator screen.

During inspection of fabricated parts, optical comparators, also called profile projectors, offer a much larger field of view and cause less eye fatigue over long usage. The saying "seeing is believing" is appropriate when referring to all optical comparators, whether being horizontal or vertical beam optical comparators. Since these measurement tools project magnified images onto a glass screen to make two dimensional measurements, a tremendous amount of information about that part can be gathered in a short time simply by looking at its image. Optical comparators project profiles of images that are see-through, other features such as the bottom of deep grooves, or other geometric features, contained on work pieces, that are out of the horizontal viewing plane are not visually accessible with respect to the top surface.

There are many diverse types of image-capturing methods within the prior art and, accordingly, there exist arrangements with a variety of applications including a wide range of sizes. Optical comparators are easier to use than most other optical measuring tools and much more all-encompassing in the market and less expensive than the more complicated coordinate measuring machine. Their versatility, range of capabilities and return on investment make comparators indispensable and integral to any quality plan.

Notwithstanding the previously described state of the art, there still remains a need to increase its measurement capacity so as to be able to expand its capability to $3^{rd}$ axis measurement without involving complex and expensive image data processing methods.

SUMMARY OF THE INVENTION

It is thus a primary object of the present disclosure to enhance the HBOC for measuring depth on a horizontal plane of a work-piece that is out of the HBOC's field of view. A contour probe linkage has been developed for contour measurement of recesses contained on work-pieces that are out of the vertical field of view. The HBOC is the machine of choice because of its vertical coordinate plane produced by a horizontally positioned "X" axis stage carrying a work-piece, a movable vertically positioned "Y" axis stage and a "Z" axis focusing stage. The present disclosure includes a probe resting on the surface of a moving work-piece while providing ways to record changes in height and depth, therein, measuring, plotting and delineating surface contours of work-pieces relative to the movable "X" axis stage, and depth along the moveable "Y" axis stage without having to refocus.

A general object of the present disclosure is to provide a method and apparatus for measuring work-pieces with three dimensional features, such as, blind holes, machined grooves, concave/convex surfaces and the like.

More specifically, it is an object of the present disclosure to provide a contour probe linkage to enable the HBOC with software to measure surfaces that are not in the lenses depth of field.

Another object of the present disclosure is to provide the ability to generate a plot from coordinate data points with respect to the surface of the work-piece, subsequently, constructing lines, circles, radius, intersect points, distances between points, curvatures, undercuts, etc so that the geometric features of the work-piece can be fully and accurately verified enabling complete measurement while using the HBOC enables the work-piece to be processed during a single setting.

Another object of the present is to provide a variety of contour probes of a specific size and length needed by the measuring requirements.

The above objects are achieved by a contour probe linkage used with a horizontal beam optical comparator for measuring features on work-pieces that are out of an objective lenses field of view. The contour probe linkage includes a cylindrical connector block and two horizontal members. The cylindrical connector block has a length and a top and a bottom. A spherical ball is attached to the top surface of the cylindrical connector block, and a probe member is attached to the bottom of the cylindrical connector block. A first horizontal member, having a length, two ends and two mounting holes placed normal and equal distance from both ends. A cylindrical connector block is fastened to each end of the first horizontal member wherein each having a different shaped probe member. The first horizontal member, with cylindrical connector block members attached, is fastened, via a mounting hole, to the end of the second horizontal member such that a selected probe member is placed facing downward. The second horizontal member has a measured length in which its other end is attached to a front panel, adjacent to a lens turret of the horizontal beam optical comparator.

The above objects are still further achieved by plotting contours of three dimensional features that are not in a lens's field of view. This method is achieved by providing a horizontal beam optical comparator with a horizontal "X" axis stage, a vertical "Y" axis stage. An objective lens is selected for required magnification and a work-piece secured on the horizontal stage. A contour probe linkage is installed, and a correct contact member selected and inserted to the contact probe linkage. The contour probe linkage is mounted to a front panel of the horizontal beam optical comparator. The contact member is placed on an upper surface of the work-piece and the horizontal stage moved while collecting x and y coordinates of the three dimensional features.

This and other objects of the present disclosure will become more apparent after referring to the following description considered in conjunction with the accompanying drawings.

The present disclosure illustrates a contour probe linkage, for use with a horizontal beam optical comparator as means of resolving a limiting capability when measuring work-pieces that have three dimensional features. The contour probe linkage eliminates the need to refocus at each change in height or depth. It is designed as a surface follower with one degree of rotational freedom for plotting contour changes while maintaining focus on a specific point on the contour probe.

Other objects and a fuller understanding of the invention may be had by referring to the following specification and claims taken in conjunction with the drawings.

DETAILED DESCRIPTION OF THE PREFERRED EMBODIMENT

Figure 1A:
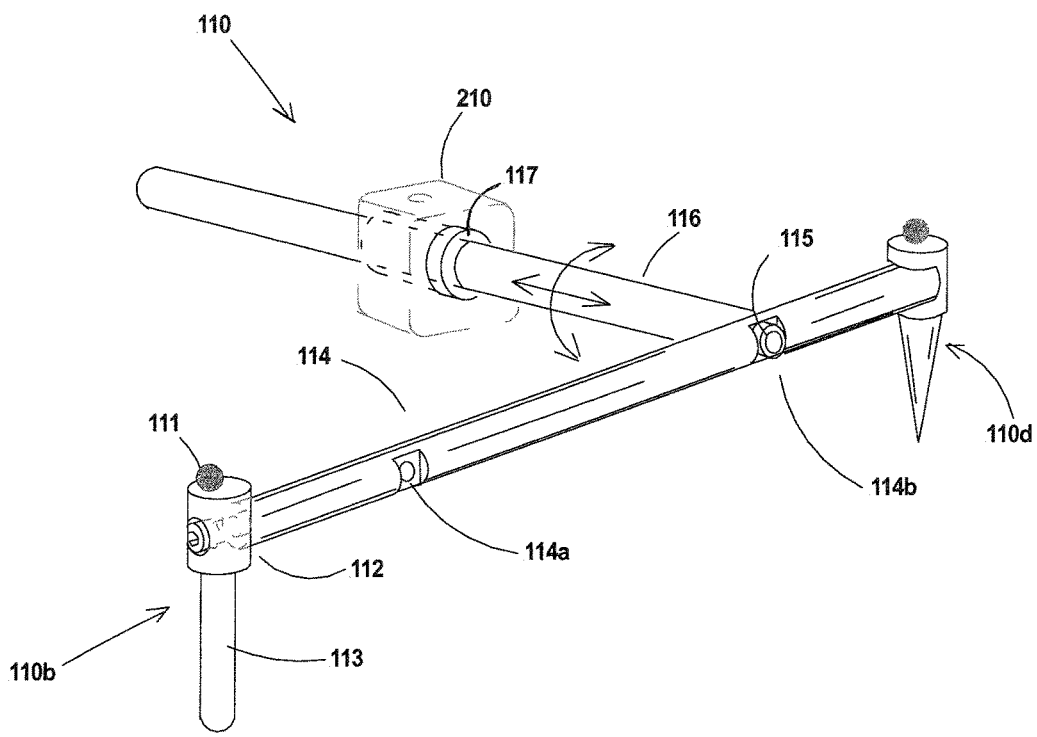
FIG. 1a is an illustration of a first embodiment of the contour probe linkage, of this disclosure.
Figure 1B:
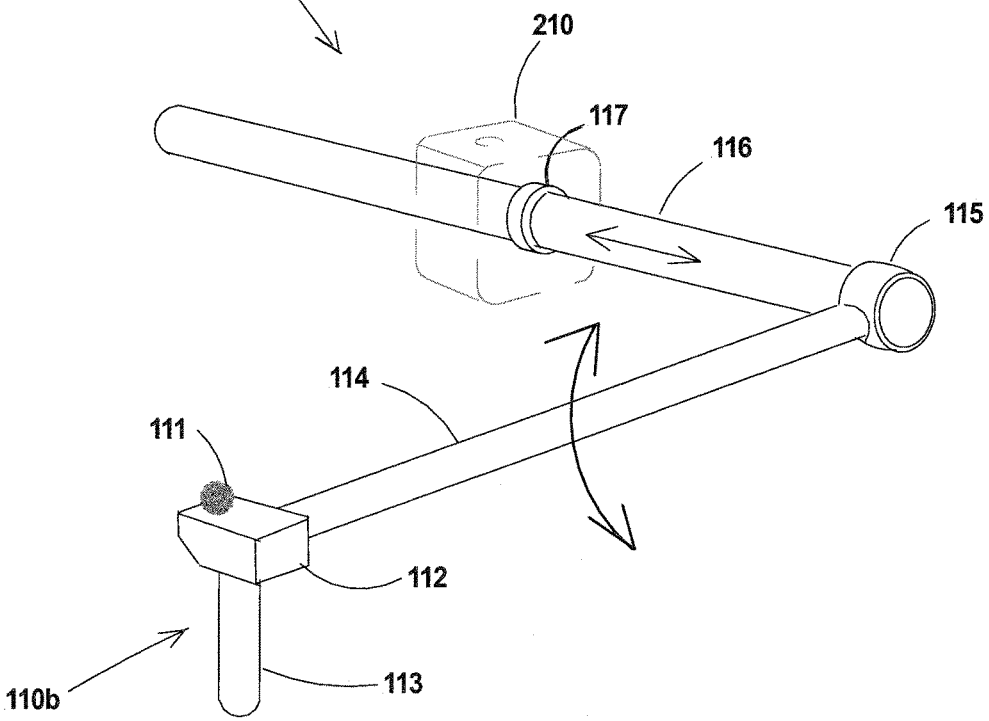
FIG. 1b is an illustration of a second embodiment of the contour probe linkage, of this disclosure.
Figure 2:
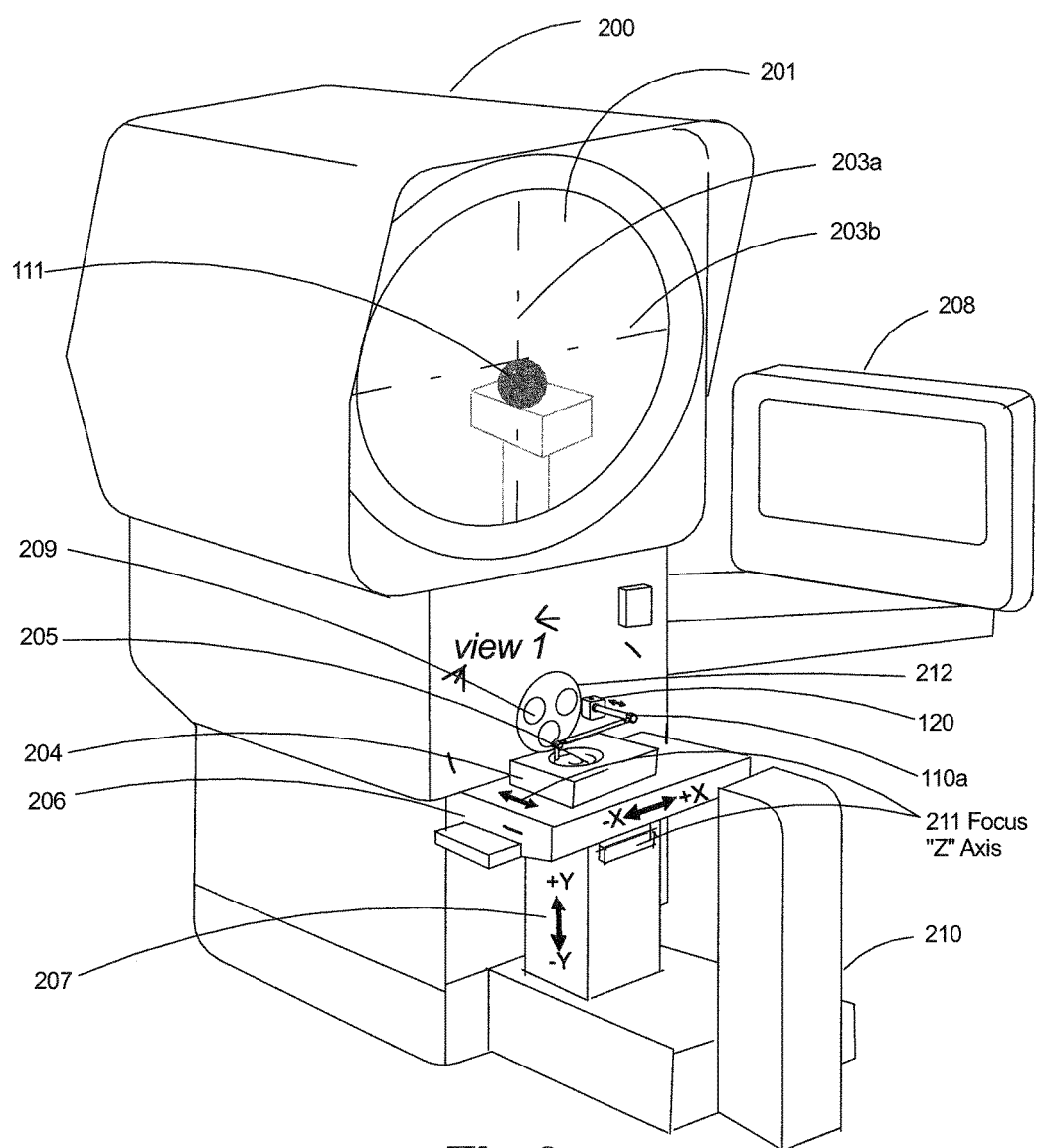
FIG. 2 is a perspective drawing of a horizontal beam optical comparator showing the contour probe linkage in place.
Figure 3:
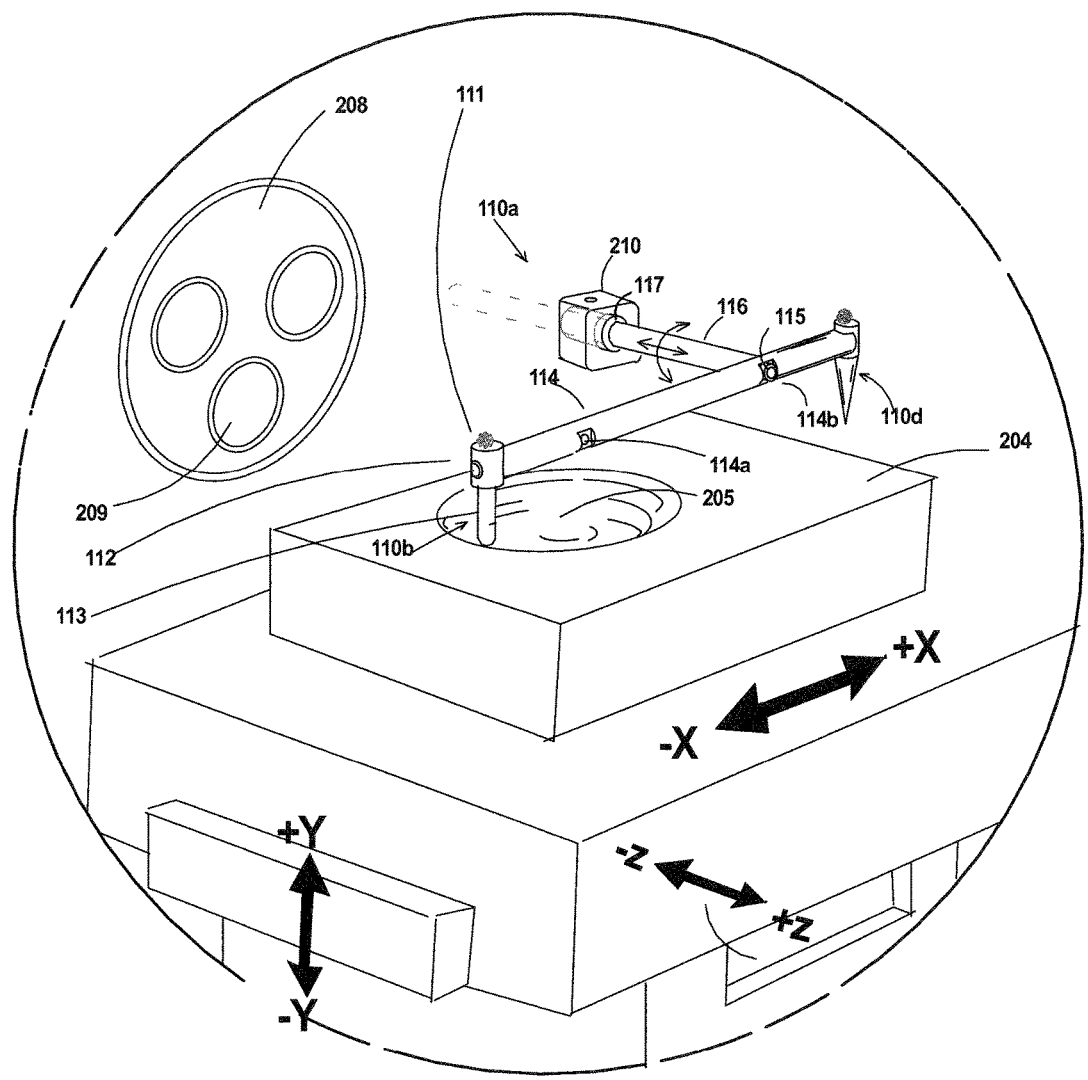
FIG. 3 shows a fragmented and enlarged view of the contour probe linkage and work-piece.

Referring now to the accompanying drawings, first referring particularly to FIG. 1 apparatus embodying the present invention shows the contour probe linkage 110 includes a cylindrical connector block 112 and two horizontal members 114 and 116. The cylindrical connector block 112 has a length and a top and a bottom. A spherical ball 111 is attached to the top surface of the cylindrical connector block, and a probe member 113 is attached to the bottom of the cylindrical connector block. A first horizontal member 114, having a length, two ends and two mounting holes 114a and 114b placed normal and equal distance from both ends. Cylindrical connector blocks 110b and 110d, are fastened, one at each end of the first horizontal member wherein, each having a different shaped probe member. The first horizontal member, with cylindrical connector block members attached, is fastened 115, via mounting hole 114b to a connecting end of the second horizontal member 116 such that a selected probe member 110b is placed facing downward. The second horizontal member has a measured length in which its other end is slideable within bushing 117 and secured within a front panel block 210 mounted adjacent to a lens turret 212 of the horizontal beam optical comparator 200 as shown in FIGS. 2 and 3.

There are variations to the embodiment shown in FIG. 1. Connector block 112 can alternately be other shapes, such as a cube or cuboid (rectangular prism), or others. Horizontal member 114 can have a single probe member 110b (rather than 2 members 110b, 110d) attached at a single point to horizontal member 116, at mounting hole 114b.

Figure 5:
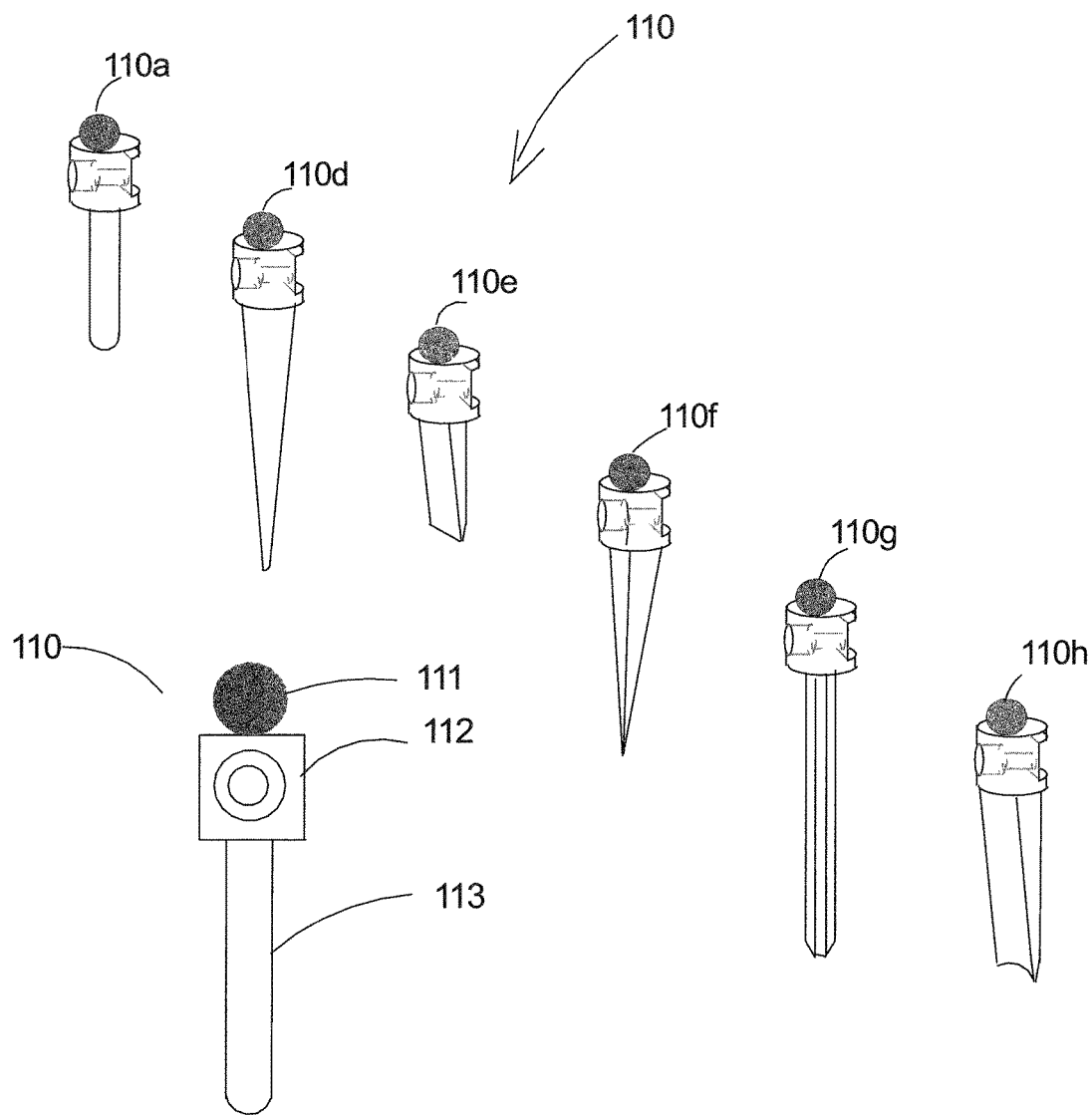
FIG. 5 illustrates several different types of contour probes.

A variety of contact members are exemplified in more detail in FIG. 5 illustrating examples of varying shapes and lengths for adapting to a variety of contour shapes.

A brief description of the horizontal beam optical comparator 200 is in order to explain the method by which the contour probe linkage 110 performs. Refer to FIG. 2 showing an overall view of the HBOC including a ground glass vertical screen 201 with 90 degree cross-lines 203a and 203b for viewing erect and reversed profile images projected by one of three lenses manually selected by turning a lens turret 212. Because of the HBOC's vertical X,Y plane provided by a horizontal "X" axis motorized stage 206 mounted on top of a "Z" axis motorized stage 211 (used for focus adjustment), and a "Y" axis motorized stage 207 mounted vertically under the "X" and "Z" stages, provides an ideal application for the present disclosure. The present disclosure describes a contour probe linkage 110 designed to follow the surface of a work-piece while providing rotational freedom to seek higher or lower surface levels for measuring changes in surface height and depth while recording, plotting and delineating surface contours of work-pieces relative to the movable "X" axis stage, and height and depth along the moveable "Y" axis stage without having to refocus. Profile illumination is provided by collimated halogen lamps contained in housing 210, surface illumination is provided by built in fiber optics located proximate to each side of turret 212.

The initial setup, prior to the contour measuring process, necessitates lifting the contour probe to secure the work-piece onto the "X" axis stage, followed by lowering the contour probe onto the upper surface of the work-piece and then adjusting the "Z" axis stage to bring the spherical ball into focus. Focus adjustment changes with each selected lens used. The "X" and "Y" motorized stages are moved such to align the spherical ball relative to the cross-lines 203a and 203b as shown in FIGS. 2 and 4a. This position establishes a first coordinate reference (0,0)

Figure 4:
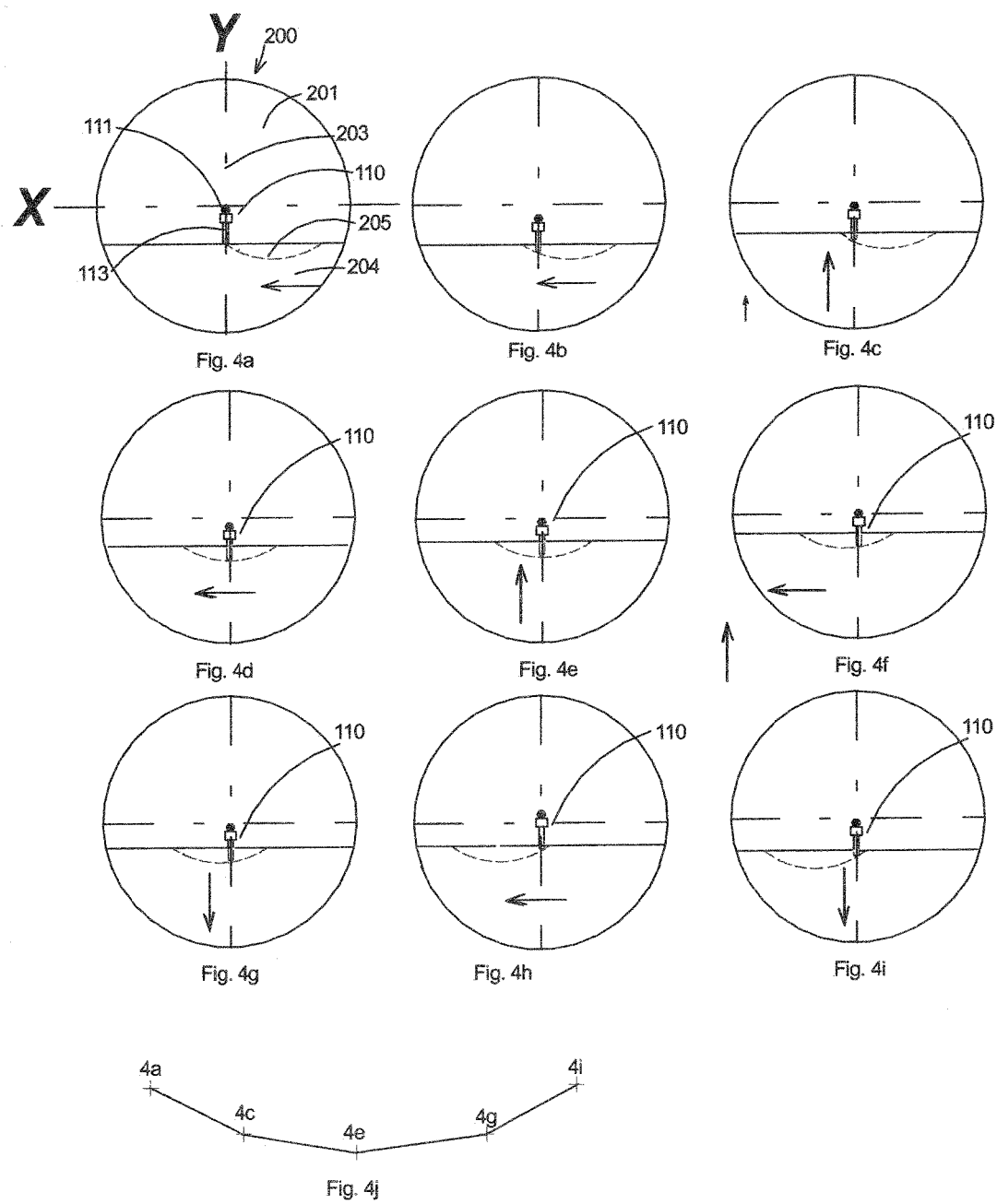
FIGS. 4a-4j shows several sequential steps illustrating the manner in which the contour probe linkage functions and with an added data points graph shown in FIG. 4j, provided by software.

FIG. 4 shows nine progressive views, 4a-4i, illustrating the contour measuring procedure. In 4a, after initial set-up, a measuring method is created by having the top of the spherical ball 111 always in focus and centered on the "Y" axis line 203a. Since the contour probe is designed to be stationary on the top surface of the work-piece during horizontal "X" axis stage movement, but free to move in the vertical "Y" axis. Thereinafter, only vertical movement becomes quantifiable, given by the vertical rotation provided by the first horizontal bar 114 and linkage bushing 115. Typically, the machine operator records a first data point, as described in the above paragraph, comprising the first $(0_1, 0_1)$ coordinate reference point prior to beginning the measurement task. Software loaded on the comparator, such as $M^2$ provided by (METLOGIX INCORPORATED, 33 South Commercial Street, Manchester, N.H. 03101), is used to record the (x,y) coordinates. Data points are preferably recorded using an edge detection system, comprising encoders and scales internal to the HBOC. Digital display 208 has, for example a numeric keypad for data entry, a display screen, and other controls for operator entry or readout of data. FIG. 4b shows movement of the "X" stage, by the direction of the arrow, until contour probe 110 lowers as indicated by the lowered spherical ball 111. In FIG. 4c, the "X" stage is stopped, the "Y" stage moves the work-piece, while also lifting the contour probe upward until the spherical ball, ascends to coordinate $(x_2,0)$ thereat, preferably automatic recording of the vertical displacement as a second data point comprising the $(x_2,-y_2)$ $2^{nd}$ coordinate. FIG. 4d shows further movement of the "X" axis motorized stage, in the direction of the arrow and a further lowering of the spherical ball 111. FIG. 4e shows the "X" stage is stopped, thereat recording the "X" coordinate, the "Y" stage moves the work-piece and contour probe upward to coordinate $(x_3,0)$ thereat, automatically recording the vertical displacement as a third data point comprising the $(x_3,-y_3)$ $3^{nd}$ coordinate. FIG. 4f shows further movement of the "X" axis motorized stage, in the direction of the arrow, and a slight upward movement of the spherical ball. FIG. 4g illustrates a downward movement of both work-piece and spherical ball to coordinate $(x_4,0)$ while recording a $(x_4,y_4)$ $4^{th}$ coordinate. FIGS. 4h and 4i show a continuation of the process described above. The process of measuring and resolving contour shapes is not limited to a specific number of data points. The accuracy and number of data points should be based on minimal variances between data points and prior knowledge of what the contour shape should be. FIG. 4j shows a graph of the recorded data points connected with a line representing the measured contour of the concave 205 shape. Of course, the more data points, the more accurate the shape of the contour.

Exemplary contact probes 110a-110h are shown in FIG. 5. Different sizes and shapes are possible and not limited to those shown. Materials for the probe member 113 can be a choice ranging in hardness from diamond tips, to plastics, in particular using a no scratching tip during curvature measurement of an optical lens, as an example.

From the foregoing description taken with the accompanying drawings, it will be apparent that this disclosure provides a highly efficient apparatus for measuring contour recesses contained on work-pieces whereby measuring shapes that are out of the field of view for the objective lens and maintaining focus on a spherical ball connected to a probe permits measurement of depth on the "Y" axis as the contour tool is pulled along the surface of the work-piece and verifying surface variances by recording and measuring variances between data point coordinates and plotting a dot image of the contour by using software, provides information to construct shapes such as lines, circles, radii, and distances between points.

Those skilled in the art will appreciate that the present disclosure can be embodied in forms other than as herein disclosed for purposes of illustration.

What is claimed is:

1. A contour probe linkage used with a horizontal beam optical comparator for measuring features on work-pieces that are out of an objective lenses field of view, said contour probe linkage comprising:
   a connector block with four sides, and a top and bottom;
   a spherical ball fixedly attached to top of said connector block;
   a probe member attached to bottom of said connector block;
   a first horizontal member having a length wherein one end is connected to a side cavity of said connector block, the other end has a bushing with a horizontal cavity affixed at its end, wherein said bushing cavity receives one end of a second horizontal member, said second horizontal member has an adjustable length, at its other end, that is slideably attached to a front panel block, adjacent to a lens turret, of said horizontal beam optical comparator at its other end.

2. The contour probe linkage of claim 1 wherein said probe member can be changed to other shaped contacts depending on a size and shape of the contour to be measured wherein shaped contacts are, round, chisel, needle point or radius.

3. The contour probe linkage of claim 1 wherein said first horizontal member has mounting holes in close proximity to each end for positioning of said contour probe linkage relative to said horizontal beam optical comparator.

4. The contour probe linkage of claim 1 wherein said spherical ball has a surface finish to augment sharpness during focusing at higher magnifications.

5. The contour probe linkage of claim 1 wherein materials for said probe member are made of stainless steel, carbide, Teflon coated aluminum or co-polymers.

6. The contour probe linkage of claim 1 wherein said first horizontal member has only rotational freedom limited to the vertical "Y" axis.

7. The contact probe linkage of claim 1 wherein said probe member rides on the upper contour surfaces of said work-piece during "X" axis scanning.

\* \* \* \* \*